2,860,172

MANUFACTURE OF FLUORINATED ORGANIC COMPOUNDS

Cyril Woolf, Long Island City, N. Y., assignor to Allied Chemical Corporation, a corporation of New York No Drawing. Application February 17, 1954
Serial No. 411,015

4 Claims. (Cl. 260—653.7)

This invention relates to the preparation of organic fluorine compounds, and is particularly directed to the fluorination of certain saturated organic halogenated compounds containing not more than two carbon atoms.

According to known commercial methods for preparing organic fluorine compounds, chlorinated hydrocarbons have been treated with fluorinating agents such as antimony trifluoride, $SbF_3$, alone or in combination with pentavalent antimony fluorochloride in liquid phase. Processes utilizing such catalysts are characterized by recognized disadvantages, among which are the corrosiveness of the antimony halides, difficulties arising out of use of a liquid reaction medium as distinguished from a solid catalyst, relatively high antimony halides volatility which causes gas line plugging, and formation of products which contain small amounts of the fluorinating promoter as impurity which is not easily removed. Hence, objects of the present invention include development of completely gas phase methods for preparing organic fluorine compounds having one or two carbon atoms by employing a novel and advantageous solid catalyst.

It has been discovered, according to the present invention, that organic fluorine compounds may be conveniently prepared by contacting a gas phase saturated aliphatic perhalogenated organic carbon compound—containing not more than two carbon atoms, at least two chlorine atoms attached to the same carbon atom, wherein all halogens are of the group consisting of chlorine and fluorine—with a solid zirconium fluoride ($ZrF_4$) catalyst, which is substantially non-crystalline in structure, while in the presence of gaseous hydrofluoric acid. Of the foregoing starting materials, compounds which contain not more than three fluorine atoms are preferred. Suitable one carbon atom starting materials (methanes) such as $CCl_4$, $CCl_2F_2$, and $CCl_3F$ are specific examples. Examples of suitable two carbon atom compounds (ethanes) starting materials are $CCl_3CClF_2$, $CCl_2FCCl_2F$, $CCl_3CCl_2F$, $CCl_3CF_3$, $CCl_2FCClF_2$, and $CCl_3CCl_3$ in place of which, as known in the art, mixtures of $CCl_2=CCl_2$ and elemental chlorine may be utilized.

The zirconium fluorides used as catalysts according to the present invention have the property of catalyzing fluorination of the above described organic halogenated compounds to form organic fluorine compounds to such an extent that good yields (percentage of sought-for product recovered based on the amount of such product theoretically obtainable from the starting material converted), good conversions (percentage of starting material which undergoes reaction), and efficient and smooth operation may be realized under readily maintained operating conditions. Further, it has been found that the catalysts of the invention in general promote symmetrical fluorination, and under varying conditions of operation, particularly at relatively low temperatures, are selective relative to formation of sought-for products and minimization of formation of unsought for products.

Zirconium fluorides including the anhydrous $ZrF_4$ are known in the art. However, zirconium fluorides in general, though possibly of powdery and small discrete particle characteristics, are composed of $ZrF_4$ crystals of relatively large size, i. e. not less than one thousand and usually several thousand Angstrom units radius and above. Other forms of $ZrF_4$ as described herein, when examined by the highest powered optical microscope, appear to be of non-crystalline or "amorphous" structure. When these "amorphous," by ordinary standards, zirconium fluorides are examined using X-ray diffraction technique, such materials are found to be bordering on the amorphous condition, and are extremely small, submicroscopic crystals which are designated in the art as "crystallite." According to the invention, the $ZrF_4$ catalysts thereof are catalytically useable size (mesh) increments, e. g. granules or pellets, which are constituted of such "amorphous" zirconium fluoride having crystallite size. The desired catalytic activity prevails in zirconium fluoride of crystallite size of about 400 Angstrom units radius or below. As crystallite size decreases below this value, desired catalytic activity increases and particularly preferred zirconium fluorides include those having crystallite size of about 150° A. and below, as determined by X-ray diffraction technique. It has been found that by contacting the organic halogenated starting compounds defined herein with the improved catalyst, controlled transformation to sought-for organic fluorine compound may be realized under favorable and easily maintained operating conditions.

The scope of the invention includes substantially anhydrous zirconium fluorides ($ZrF_4$) having the indicated crystallite size, and provided such fluorides are derived by reaction of substantially anhydrous $ZrCl_4$ and substantially anhydrous hydrogen fluoride. The improved catalytic material employed is prepared by treating $ZrCl_4$, which is preferably as anhydrous as commercially feasible and preferably in pure form but may suitably be of commercial or technique grade, with preferably excess quantities of inorganic fluorinating agent reactive therewith under conditions such that no liquid water is present in the reacting materials. For example, catalyst may be prepared by treating solid substantially anhydrous zirconium chloride (intended herein to designate $ZrCl_4$ and not other forms of zirconium chloride) with gaseous substantially anhydrous HF. In a gas phase fluorination operation, using HF, temperatures may be anything from above the vaporization point of HF up to about 250° C. at which temperature e. g. anhydrous $ZrCl_4$ begins to sublime appreciably. If desired, the reaction may be carried out with fluorinating agent in the liquid phase. In the catalyst synthesis reaction, HF displaces HCl causing transformation of $ZrCl_4$ to $ZrF_4$. To condition the material for better catalytic use, the resulting zirconium fluoride may be heated in an anhydrous atmosphere at elevated temperature, i. e., temperature at which conditioning or activation takes place. The finished catalyst is then recovered. Heating the $ZrF_4$ in a stream of dry nitrogen or anhydrous HF gas for about one to four hours at temperatures of about 300–350° C. or four to six hours at 250–300° C. is ordinarily suitable for this purpose. In some circumstances, the catalyst may be activated by heating the $ZrF_4$ in a stream of free oxygen-containing gas such as oxygen or air at about 400–500° C. for approximately 30 minutes to eight and one-half hours, depending mostly on the oxygen content of the treatment gas, in which case conditioning with dry nitrogen or HF gas as above mentioned may be omitted.

Zirconium fluorides prepared by the above described method of treating anhydrous $ZrCl_4$ with substantially anhydrous HF have been found to be composed of crystallites of size below about 400° A., and generally substantially below 150° A. as is desired for fluorination according to a preferred form of the invention. Gas phase preparation of catalyst is illustrated in the following example, in which parts and percentages unless otherwise noted, are on a weight basis.

Example A 180 parts of 4 to 14 mesh anhydrous zirconium tetrachloride of commercial grade were charged to a one inch I. D. tubular nickel reactor provided with inlet and outlet connections for a gas stream and means for externally cooling the reactor by blasts of air. An externally disposed electrical resistance heater was also supplied to furnish heat to the reactor when needed. Gaseous anhydrous HF, initially at the rate of 20 parts per hour, was passed through the reactor while maintaining the maximum internal temperature in the reactor in the range of 60–70° C. by adjusting the extent of external cooling. Reaction of $ZrCl_4$ and HF to form $ZrF_4$ and HCl was effected. Means were provided for sampling the reactor effluent gas to determine the presence of HF and/or HCl. Initially, the point of maximum reaction temperature was near the upstream end of the bed of solid zirconium chloride. Exit gas from the reactor was periodically sampled and when the evolution of HCl began to slacken and HF began to appear, the reaction temperature was gradually raised to 200° C. After 5 hours' reaction, the reactor effluent gas contained only HF and was substantially free of HCl. 130 parts of zirconium fluoride, containing 98% $ZrF_4$ and less than 0.5% chlorine, in hard granular form and having substantially the same mesh size as the initial zirconium chloride, were obtained. An X-ray diffraction pattern of zirconium fluoride catalyst so prepared showed that the material, constituting the approximate 4–14 mesh catalyst, had average crystallite size to be about 50 Angstrom units radius, i. e. the crystallite size was so small as to be indicative of "amorphous" structure.

If, in a gas-phase operation such as just detailed, the $ZrCl_4$ is initially in very fine or powdery form, prior to HF gassing the material may be pelleted to e. g. 4–25 mesh size, in which case pelleting should be done preferably under conditions as anhydrous as feasible.

Another suitable and convenient means for preparing the zirconium fluoride catalyst is to add solid anhydrous $ZrCl_4$ to an excess of liquefied anhydrous hydrofluoric acid in a cooled container and, after complete addition of the $ZrCl_4$, mildly to agitate the mixture until reaction is substantially complete. The $ZrF_4$ so prepared may be then conditioned or activated as outlined above. Following is an example in which parts and percentages are on a weight basis, illustrating preparation of $ZrF_4$ catalyst according to the latter wet method.

Example B 175 parts of granular (4 to 14 mesh) anhydrous $ZrCl_4$ of commercial grade were added in small portions to liquid anhydrous hydrofluoric acid contained in an externally cooled vessel. Vigorous exothermic reaction took place and additional amount of liquid anhydrous HF were added as needed to maintain an excess thereof. After all the zirconium chloride had been added, the mixture was stirred to promote residual reaction. When reaction of zirconium chloride appeared complete, the mass was mixed and stirred with additional liquid hydrofluoric acid and excess HF was removed by slowly boiling the mixture. 125 parts of anhydrous zirconium fluoride of about 4–20 mesh size having greater than 98% $ZrF_4$ content and containing less than 0.5% chlorine were recovered. This $ZrF_4$ was heated in a stream of dry inert gas (nitrogen) at a sufficiently elevated temperature, about 300° C., and a period of time sufficiently long, about 3 hours, to condition and activate the material. The mesh size distribution of the $ZrF_4$ particles did not change substantially during the latter heat treatment. An X-ray diffraction pattern of material thus prepared showed that the 4–20 mesh catalyst comprised material of average crystallite size of about 50 A., i. e. the crystallite size was so small as to be indicative of "amorphous" structure.

In the utilization of the catalysts of the invention to effect fluorination of the starting material indicated, which catalysts are usually employed in the unsupported form, reaction temperatures are maintained at or above the level at which fluorination of the particular starting compound begins to take place in the presence of gaseous HF and the solid $ZrF_4$. Generally speaking, some fluorination may be noted at temperature as low as about 175° C., but reaction proceeds at a more satisfactory rate and fluorination will generally be more complete at temperatures upwardly of 200° C. While fluorination proceeds and yields of sought-for products may be realized at temperature as high as about 600° C., at temperatures from about just below 500° C. to about 600° C. a slow but perceptible transformation of $ZrF_4$ crystallites into crystals having larger size may be noted. When the size of such crystals substantially exceeds about the 400 Angstrom units radius set forth above, catalyst activity is substantially impaired. Hence, particularly to avoid deactivation of the catalyst, temperatures up to a little below 500° C. are particularly desirable, and in over-all general practice, temperatures in the range of approximately 200–425° C. are preferred.

Choice of reaction temperature is determinable to a degree by the nature of the starting material employed and the nature of the sought-for products. For example, in the case of starting materials containing up to two fluorine atoms and only moderate further fluorination is sought, relatively low temperatures may be used, but if higher degree of fluorination is desired, higher reaction temperatures are in order. Similarly, in the case of starting materials of higher fluorine content, higher temperatures are needed to effect further fluorination. To illustrate, $CCl_3CClF_2$ and $CCl_4$ are representative preferred starting materials, and when using these compounds temperatures in the range of 200–325° C. are suitable, and temperatures in the range of 200–300° C. are preferred. The foregoing indicated temperatures designate temperatures within the catalyst bed, i. e. inside the reaction tube. Due to the exothermic nature of the fluorination reactions, input of extraneous heat to overcome heat absorption and losses within the system are so slight that an extraneous heater for this purpose may normally be maintained at temperature not more than 5–10° C. higher than that in the catalyst bed, in the case of small say half to one inch internal diameter reaction tubes.

The molar ratio of HF to starting material is determined largely by the amount of fluorine desired in the sought-for product. That is, if a highly fluorinated product is desired and the starting material is originally of low fluorine content and contains a relatively large number of halogen atoms other than fluorine to be substituted, corresponding large amounts of HF are introduced into the reactor with the starting material. One mol of HF for each atom of other halogen to be substituted is the theoretical amount. On the other hand, from a practical point of view it is highly desirable to maintain the ratio of HF to organic sufficiently low so that a high percentage utilization of fluorine will be obtained thereby simplifying the potentially difficult problem of recovering HF from the product mixture, since recycling of unreacted starting material is more practical than recovery of unreacted HF. Hence, at least about 25% and not substantially more than about 100% of the theoretical amount of HF is introduced with the organic compound into the fluorination reaction. Preferred percentages are 50–70% of the theoretical amount of HF. For example, when fluorinating $CCl_4$ with the object of preparing $CCl_2F_2$, preferred molar ratios of HF to $CCl_4$ lie in the approximate range 1:1 to 1.5:1, and when fluorinating $CCl_3CClF_2$ to form $CCl_2FCClF_2$ preferred molar ratios of HF to $CCl_3CClF_2$ lie in the range of about 0.4:1 to 0.75:1.

Time of contact of starting material with zirconium fluoride catalyst may be varied to some extent without noticeable sacrifice in advantageous high process efficiency. However, if contact time is excessive (low space velocities), the capacity of the reactor is low. On the other hand, if contact time is excessively short (high space velocities), the reaction of starting material to form desired product may be incomplete, thereby entailing possible high cost of recovering and recycling unreacted material to subsequent operation. Accordingly, the time of contact is determined usually by balancing economic advantages of high throughput obtained at short contact times against the cost of recovery of unreacted starting material. In general, contact time is less than about 60 seconds, and preferably contact time is less than about 25 seconds. In a particular operation optimum rate of flow of starting material through the reaction zone is dependent upon variables such as scale of operation, quantity of catalyst in the reactor and specific apparatus employed and may be best determined by a test run.

For convenience, atmospheric pressure operation is preferred but the reaction may, if desired, be carried out at superatmospheric or subatmospheric pressure, the choice of pressure being one of convenience, e. g. determined by the nature of prior treatment of starting material or subsequent treatment of the reaction product.

Generally, the process of the invention is carried out by contacting the starting compound with the $ZrF_4$ catalyst at temperature at which fluorination takes place in the presence of gaseous HF. Operations may be suitably carried out by introducing a gaseous mixture of reactants into a reaction zone containing the catalyst and heating said mixture in the zone at indicated temperatures for a time sufficient to convert an appreciable amount of the organic halogenated compound to fluorinated compound, withdrawing gaseous products from the zone and recovering said fluorinated material from the gaseous products. Operation is preferably continuous. Also for example, for purposes of temperature control, the reactants may be diluted with other gaseous material, e. g. an inert gas such as nitrogen, and the mixture of such inert gas and reactants introduced into the reaction zone.

The sought-for product in the gas stream exiting the reaction zone may be recovered in any suitable manner. The gas discharged from the reactor may be cooled and subjected to scrubbing with water, aqueous caustic solution (if it is desired to remove residual amounts of HCl and HF) then passed over calcium chloride or other drying agent to remove water. The identity and amount of product in the gas stream may be conveniently determined by conventional infra red analytical technique. The gaseous product may be condensed in a vessel maintained at a temperature substantially below the boiling point of the lowest boiling material present, e. g. by indirect cooling of the gas in a bath of acetone and carbon dioxide ice. The particular products recovered depend, as indicated above, upon starting material and reaction conditions such as temperature, molar ratio of the reactants, etc. Pure product may be recovered by distillation of condensates obtained above, and unreacted halogenated compound starting material recycled to subsequent operation. By practice of the invention, a diversification of products may be obtained dependent upon the starting materials and operating conditions employed. In general the more symmetrically fluorinated products of reaction are formed at lower temperatures, while at higher temperatures the more unsymmetrically fluorinated products of reaction may be formed. Products obtainable include: from $CCl_4$—$CCl_3F$, $CCl_2F_2$, and $CClF_3$; from $CCl_3F$—$CCl_2F_2$, and $CClF_3$; from $CCl_3.CCl_3$—$CCl_3CCl_2F$, $CCl_2FCCl_2F$, $CCl_3.CClF_2$, $CCl_2FCClF_2$, $CCl_3CF_3$, $CCl_2FCF_3$, and $CClF_2CClF_2$; from $CCl_3CCl_2F$—$CCl_2FCCl_2F$, $CCl_3CClF_2$, $CCl_2FCClF_2$, $CCl_3CF_3$, $CCl_2FCF_3$, and $CClF_2CClF_2$; from either $CCl_2FCCl_2F$ or $CCl_3CClF_2$—$CCl_2FCClF_2$, $CCl_3CF_3$, $CCl_2FCF_3$, and $CClF_2CClF_2$; from $CCl_3CF_3$—$CCl_2F.CF_3$; from $CCl_2FCClF_2$—$CCl_2F.CF_3$ and $CClF_2CClF_2$.

Any suitable chamber or reactor tube constructed of inert material may be employed for carrying out the reaction provided the reaction zone is of sufficient length and cross-sectional area to accommodate the required amount of catalyst necessary to provide adequate gas contact area and at the same time afford sufficient free space for passage of the gas mixture at an economical rate of flow. Material such as nickel, graphite, Inconel and other materials resistant to HF may be suitable for reactor tubes. Externally disposed reactor tube heating means such as electrical resistance heaters may be supplied for use in instances where reaction is not strongly exothermic.

The following examples illustrate practice of the invention, parts and percentages being by weight unless otherwise indicated:

*Example 1*

250 cc. of 4 to 14 mesh of zirconium fluoride catalyst, prepared by procedure substantially described in Example A above, activated just before use by heating for about one hour in a stream of oxygen at about 500° C. and composed of crystallites of size below about 100 A., were arranged in a fixed bed supported in a vertically disposed one inch inside diameter nickel tube 36 inches long. The tube was externally electrically heated over a length of 30 inches and the tube ends were fitted with pipe connections for the inlet and outlet of a gas stream. Suitable thermocouples were arranged internally of the catalyst bed. Liquid $CCl_4$ was vaporized, mixed with gaseous HF in the proportion of 1.5 mols of HF per mol of $CCl_4$, the mixture preheated to 100° C., and introduced at the rate of about 154 parts of $CCl_4$ per hour into the feed end of the nickel tube and passed through the bed of $ZrF_4$ catalyst. By adjusting the electrical heaters thereby to control the rate of heat input in the gas stream, the temperature of the reaction tube as measured internally was maintained at about 250° C. Contact time was about 9 seconds. Gaseous products of the reaction were withdrawn from the discharge end of the nickel tube, cooled, and thence passed successively through a water scrubber, a calcium chloride drying tube and a condenser held at about minus 78° C. by means of an external cooling bath of carbon dioxide ice and acetone. Condensate collected in the water scrubber was combined with cold trap condensate, and the mixture was fractionally distilled and found to contain equimolecular quantities of $CCl_2F_2$ and $CCl_3F$, i. e. 60 parts of $CCl_2F_2$ and 69 parts of $CCl_3F$ produced per hour. Conversion of HF was substantially 100%. Conversion of starting material was about 100%. This example illustrates an outstanding advantage afforded by $ZrF_4$ catalyst of the invention, i. e. the production, at markedly low fluorinating temperature, of economically desirable $CCl_2F_2$ and $CCl_3F$ products, and the absence of formation of the unwanted $CClF_3$.

*Example 2*

180 grams (250 cc. 4–14 mesh) of zirconium fluoride catalyst prepared by procedure substantially the same as in Example B above, and composed of crystallites of size below about 100 A., were arranged in a fixed vertical bed supported in a one inch inside diameter nickel reaction tube 36 inches long, and arranged for heating and temperature recording substantially as described in Example 1. Gaseous $CCl_3CF_2Cl$ (having a boiling point of 92° C.) mixed with gaseous HF in $HF/CCl_3CClF_2$ mol ratio of 0.55 was passed through the nickel tube and bed of catalyst while maintaining the internal tube temperature at about 260° C. Feed rate of $CCl_3CF_2Cl$ was about 204 parts per hour, and contact time was about 12 seconds. The gas efflux from the tube was cooled, scrubbed with water, dried and condensed in an acetone-Dry Ice trap. Condensates from the water scrubber and trap were distilled. About 61% of the HF reacted, and 114 parts of $CCl_2FCClF_2$ (B. P. 47.7° C.), were recovered, i. e. yield of $CCl_2FCClF_2$ being substantially quantitative based on the amount of $CCl_3CClF_2$ reacted. This run illustrates another important advantage provided by the catalyst of the invention, i. e. low temperature fluorination, substantially quantitative yield of economically valuable $CCl_2FCClF_2$, and absence of formation of the more undesirable isomer $CCl_3CF_3$.

I claim:

1. The process for fluorinating an organic compound which comprises introducting a gas-phase mixture of substantially anhydrous HF and a substantially anhydrous saturated aliphatic perhalogenated organic carbon compound—containing not more than two carbon atoms, not more than two fluorine atoms, at least two chlorine atoms attached to the same carbon atom, and wherein all halogens are of the group consisting of chlorine and fluorine—into a reaction zone containing substantially anhydrous zirconium fluoride catalyst having crystallite size not substantially greater than about 400 Angstrom units radius and having been derived by reaction of substantially anhydrous $ZrCl_4$ and substantially anhydrous HF, heating said mixture in said zone in contact with said catalyst at fluorination temperature in the approximate range of 200–300° C. to effect fluorination of a substantial amount of said compound to form gaseous reaction product comprising organic fluorinated compound, withdrawing said product from said zone and recovering said fluorinated compound from said product.

2. The process for fluorinating an organic compound which comprises introducing a gas-phase mixture of substantially anhydrous HF and a substantially anhydrous saturated aliphatic perhalogenated organic carbon compound, of the group consisting of $CCl_4$ and $CCl_3CClF_2$, into a reaction zone containing substantially anhydrous zirconium fluoride catalyst having crystallite size not substantially greater than about 400 Angstrom units radius and having been derived by reaction of substantially anhydrous $ZrCl_4$ and substantially anhydrous HF, heating said mixture in said zone in contact with said catalyst at fluorination temperature in the approximate range of 200–300° C. to effect fluorination of a substantial amount of said compound to form gaseous reaction product comprising organic fluorinated compound, withdrawing said product from said zone and recovering said fluorinated compound from said product.

3. The process for making a fluorinated ethane which comprises introducing a gas phase mixture of substantially anhydrous HF and substantially anhydrous tetrachlorodifluoroethane into a reaction zone containing substantially anhydrous zirconium fluoride catalyst having crystallite size not substantially greater than about 400 Angstrom units radius and having been derived by reaction of substantially anhydrous $ZrCl_4$ and substantially anhydrous HF, heating said mixture in said zone in contact with said catalyst at fluorination temperature in the approximate range of 200–300° C. to effect fluorination of a substantial amount of said tetrachlorodifluoroethane to form gaseous reaction product, comprising $CCl_2FCClF_2$, withdrawing said product from said zone and recovering $CCl_2FCClF_2$ from said product.

4. The process for making fluorinated methane which comprises introducing a gas phase mixture of substantially anhydrous HF and substantially anhydrous carbon tetrachloride into a reaction zone containing substantially anhydrous zirconium fluoride catalyst having crystallite size not substantially greater than about 400 Angstrom units radius and having been derived by reaction of substantially anhydrous $ZrCl_4$ and substantially anhydrous HF, heating said mixture in said zone in contact with said catalyst at fluorination temperature in the approximate range of 200–300° C. to effect fluorination of a substantial amount of said carbon tetrachloride to form gaseous reaction product comprising $CCl_2F_2$ and $CCl_3F$, withdrawing said product from said zone and separately recovering $CCl_2F_2$ and $CCl_3F$ from said product.

References Cited in the file of this patent

UNITED STATES PATENTS

| | | |
|---|---|---|
| 2,423,045 | Passino | June 24, 1947 |
| 2,637,748 | Miller | May 5, 1953 |
| 2,709,688 | Bandes et al. | May 31, 1955 |
| 2,714,618 | Woolf | Aug. 2, 1955 |
| 2,748,177 | Miller | May 29, 1956 |